(12) United States Patent
Chen et al.

(10) Patent No.: US 8,868,611 B2
(45) Date of Patent: Oct. 21, 2014

(54) DATA MANAGEMENT SYSTEM FOR EFFICIENT STORAGE AND RETRIEVAL OF MULTI-LEVEL/MULTI-DIMENSIONAL DATA

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 13/192,602

(22) Filed: Jul. 28, 2011

(65) Prior Publication Data
US 2013/0031137 A1 Jan. 31, 2013

(51) Int. Cl.
*G06F 17/30* (2006.01)

(52) U.S. Cl.
CPC .................. *G06F 17/30592* (2013.01)
USPC ........... 707/793; 707/796; 707/797; 707/800; 707/801

(58) Field of Classification Search
None
See application file for complete search history.

(56) References Cited

U.S. PATENT DOCUMENTS

| | | | |
|---|---|---|---|
| 6,424,967 B1 * | 7/2002 | Johnson et al. | 1/1 |
| 2002/0143521 A1 * | 10/2002 | Call | 704/1 |
| 2003/0126143 A1 * | 7/2003 | Roussopoulos et al. | 707/100 |
| 2007/0143353 A1 | 6/2007 | Chen | |
| 2007/0174309 A1 * | 7/2007 | Pettovello | 707/100 |
| 2008/0021853 A1 | 1/2008 | Modha et al. | |
| 2008/0229298 A1 | 9/2008 | O'Brien et al. | |
| 2010/0146013 A1 | 6/2010 | Mather | |
| 2010/0250831 A1 | 9/2010 | O'Brien et al. | |
| 2011/0313973 A1 * | 12/2011 | Srivas et al. | 707/634 |

OTHER PUBLICATIONS

Author: Peter A. Buhr, Anil K. Goel and Anderson Wai; Title: "uDatabase: A Toolkit for Constructing Memory Mapped Databases"; Date: Sep. 1992; Publisher: Springer-Verlag; Pertinent pp. 1-15 (whole document as attached.).*
Author: Alfredo Cuzzocrea; Title: "Accuracy Control in Compressed Multidimensional Data Cubes for Quality of Answer-based OLAP Tools"; Date: year 2006; Publisher: IEEE; Pertinent pp. 1-10 (whold document as attached.).*
"Using Memory Mapped Files4 to Quickly Transfer Data Between Process", Mar. 2, 2009.

* cited by examiner

*Primary Examiner* — Anh Tai Tran

(57) ABSTRACT

The present application is directed to a data management system. The data management system is implemented within a computer system that includes one or more processors, one or more electronic memories, and a memory-mapped file facility that electronically stores data. The data management system, implemented by data management system control routines that are executed by the one or more processors, retrieves a particular projection of a multi-level, multi-dimension data set stored within the ONP-tree data structure that contains the multi-level, multi-dimension data set.

20 Claims, 20 Drawing Sheets

```
1  hashObj lowestG;                          ── 1802
2  stack st;           ──────── 1804
3  list<hashObj> objs;  ──────── 1806
4  list<name>nodeNames;   ──────── 1808

5  void partition(hashObj & inputObj)   ──────── 1810
6  {
7      dimension nxt;  //initialized to first dimension
8      hashObj lastObj = inputObj;
9      hashObj* nxtObj;
10     name nm;
11
12     if (st.empty()) st.push(nxt);
13     else if (st.top().last()) return;
14     else st.push(st.top()++);
15
16     do
17     {
18         nxtObj = new hashObj(lastObj, st.top());
19         objs += *nxtObj;
20         nm = '/';
21         nm += st.bottom().name();
22         while (st.next(nxt)) nm = nm + '/' + nxt.name();
23         nodeNames += nm;
24         partition(*nxtObj);
25         nxt = st.pop();
26         if (nxt.last()) break;
27         lastObj = lastObj - *nxt.Obj;
28         st.push(++nxt);
29     }
30     while (true);
31 }
```

FIG. 18

DATA MANAGEMENT SYSTEM FOR EFFICIENT STORAGE AND RETRIEVAL OF MULTI-LEVEL/MULTI-DIMENSIONAL DATA

TECHNICAL FIELD

The present application is addressed to efficient storage and retrieval of data within computer systems and, in particular, to an efficient method and system for storing and retrieving multi-level, multi-dimensional data used by various types of computer application programs, including on-line application-processing application programs and user interfaces.

BACKGROUND

In early computer systems, data was stored on decks of punched cards or on magnetic tapes for use by particular application programs. The amount of data that could be stored and retrieved by an application program was significantly constrained by the relatively small data capacities of these data-storage subsystems, and applications were constrained by the primitive interfaces and facilities for storing and retrieving data. Subsequently, electronic data-storage devices and systems were developed and rapidly evolved. As computer processors and computer systems rapidly acquired ever greater computational bandwidths and as software development tools allowed for development of more complex and robust application programs, database management systems emerged as flexible and highly capable subsystems within computer systems. Database management systems provide query-based interfaces that allow for more complex data-storage and data-retrieval operations as well as for more flexible and complex manipulation and processing of data stored within the database management systems. Relational database management systems ("RDBMSs") are widely used in modern computing and provide a relatively standardized structured-query-language ("SQL") interface based on the relational algebra.

While RDBMSs and high-capacity physical data-storage systems provide enormous data-storage, data-retrieval, and data-manipulation capabilities to application programs running on a variety of different types of computer systems, RDBMSs systems may provide non-optimal functionality and performance characteristics for certain types of applications. On-line application processing ("OLAP") business-intelligence applications that provide OLAP-cube-based data access and manipulation to business-analysis application programs and, through sophisticated graphical user interfaces ("GUIs"), to human users and analysts provide a good example of applications for which the functionality and performance characteristics of RDBMSs are generally non-optimal. While the multi-level, multi-dimensional ("ML/MD") data manipulated by the OLAP-cube-based OLAP applications and GUIs can be stored in relational database tables, storing such massive amounts of data in relational database tables incurs significant access delays, relatively low-efficiency use of physical data-storage subsystems, and additional computational inefficiencies. The sophisticated capabilities of RDBMSs are not effectively employed when used for storing the ML/MD data and ML/MD data does not efficiently map to the RDBMSs table-based paradigm. OLAP application and GUI developers and vendors, and, ultimately, users of OLAP applications and GUIs, continue to seek efficient data-storage and data-manipulation systems and facilities for ML/MD data storage and retrieval.

BRIEF DESCRIPTION OF THE DRAWINGS

FIG. 1 shows a number of individual data values that may be stored and processed by a business-intelligence application.

FIGS. 7-11 illustrate a small example set of OLAP cube data.

FIG. 16 shows a tree-like partitioning of ML/MD data related to five dimensions A, B, C, D, and E employed in an efficient data management system that represents an embodiment of the efficient data management systems to which the present application is directed.

FIGS. 17 and 18 illustrate the generation of hash objects that represent nodes in the tree-like data structure described above with reference to FIGS. 15 and 16 employed in an efficient data management system that represents an embodiment of the efficient data management systems to which the present application is directed.

DETAILED DESCRIPTION

The present application is directed to an efficient database management system ("DBMS") for multi-level/multi-dimensional ("ML/MD") data, including ML/MD data that is used by on-line application processing ("OLAP") applications and graphical user interfaces ("GUIs"). Particular embodiments employ efficient storage of ML/MD data using memory-mapped files ("MMFs"), avoiding the overheads associated with various types of existing DBMSs, such as RDBMs, the underlining data models of which do not efficiently accommodate ML/MD data and ML/MD access patterns.

Figure 1:
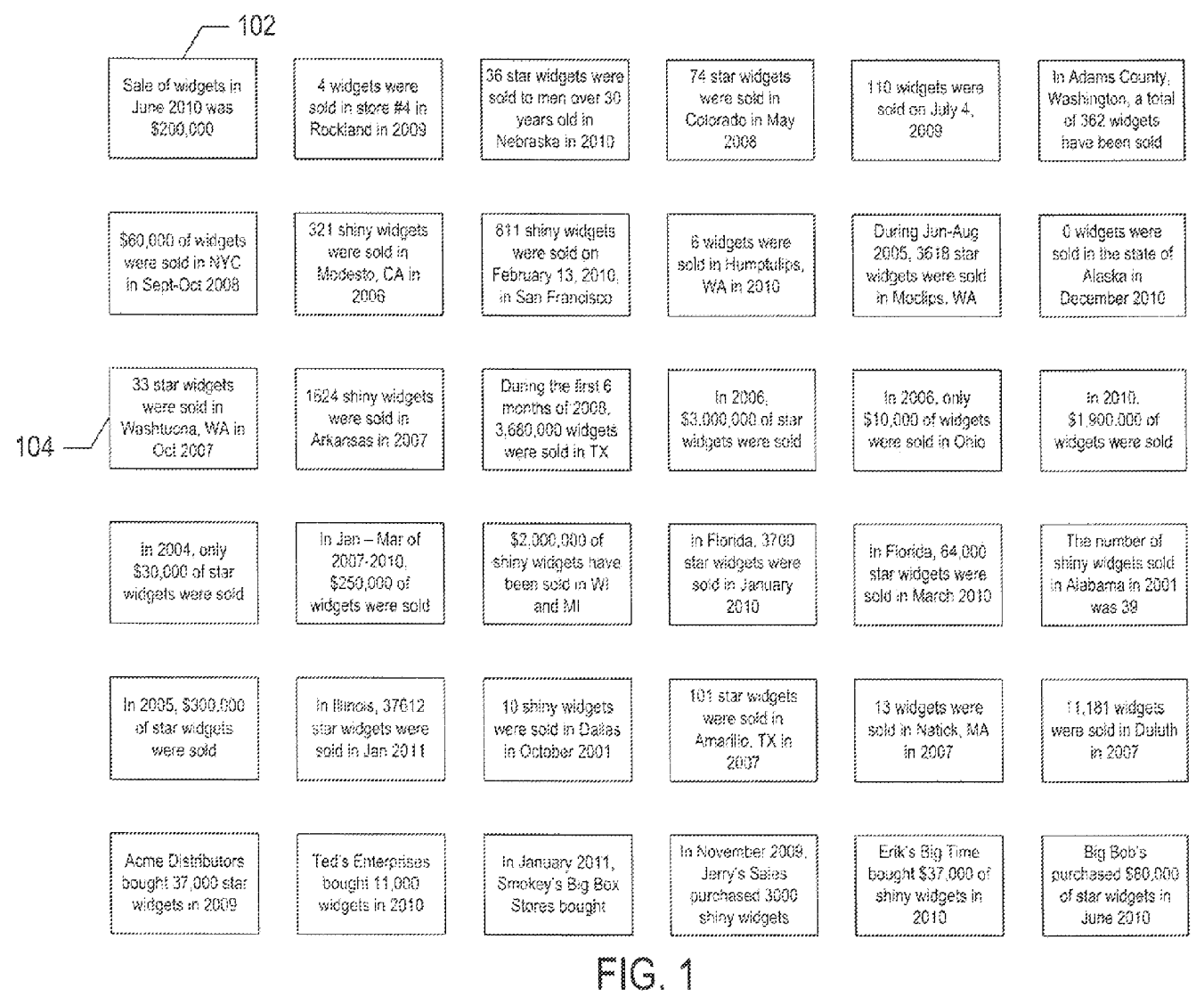

FIG. 1 shows a number of individual data values that may be stored and processed by a business-intelligence application. In FIG. 1, each data value is represented as a rectangle-enclosed statement, such as the rectangle-enclosed statement "sale of widgets in June 2010 was $200,000" 102. FIG. 1 shows 36 different discrete data values of potentially hundreds of thousands, millions, or more data values that may be collected, over time, by a business organization. The challenge for OLAP applications and GUIs is to meaningfully organize the data values for presentation to human users and analysts viewing the data through an OLAP GUI and for manipulation by OLAP applications.

Figure 2:
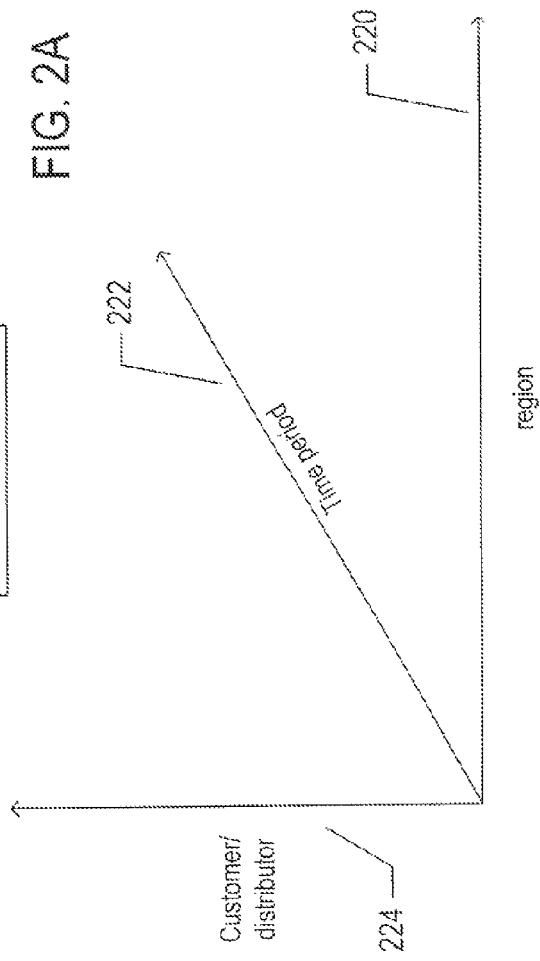
FIGS. 2A-B illustrate certain organizational principles underlying the OLAP cube paradigm for data management and data access.

FIGS. 2A-B illustrate certain organizational principles underlying the OLAP cube paradigm for data management and data access. Each of the various data values shown in FIG. 1 can be categorized as belonging to one of six types of data value, or measure, as shown in FIG. 2A. The six measures include: (1) a dollar amount of widgets sold 202; (2) a number of widgets sold 204; (3) a dollar amount of shiny widgets sold 206; (4) a number of shining widgets sold 208; (5) a dollar amount of star widgets sold 210; and (6) a number of star widgets sold 212. Each of the data values shown in FIG. 1 can be classified as a measure of one of these six types of measures.

As shown in FIG. 2B, the six types of measures can be related to additional values selected with respect to one or more of three dimensions. The three dimensions are plotted, in FIG. 20, as three mutually octagonal axes in a three-dimensional Cartesian space, and include an axis corresponding to geographical region 220, an axis corresponding to time period 222, and an axis corresponding to the customer or distributor 224 who purchased widgets, shiny widgets, or star widgets.

Each fact shown in FIG. 1 can be mapped to points, two-dimensional surfaces, or three-dimensional sub-volumes of the three-dimensional Cartesian space shown in FIG. 2B. Returning to FIG. 1, consider fact 102. This is the total dollar amount of widgets sold in June of 2010. This fact is an example of the first type of metric (202 in FIG. 2A). The fact pertains to a particular time period, June of 2010, and the dollar amount presumably includes widgets sold to all of the different customers and distributors in all regions. Thus, in the coordinate space shown in FIG. 2B, this fact would represent the sum of all widget sales figures within a large flat rectangular volume orthogonal to the time-period axis 222 that intersects the time-period axis over a range of time-period values within June 2010. By contrast, consider fact 104 in FIG. 1. This fact states that 33 star widgets were sold in Washtucna, Wash. in October of 2009. This fact thus corresponds to a sum of the numbers of all star widget sold contained in a two-dimensional sheet with long axis parallel to the customer/distributor axis 224 that intersects the time-period/region plane on a short line segment parallel to the time-period axis that represents the region Washtucna, Wash. and all data points within October 2009. Sub, volumes, two-dimensional sheets, and points within the three-dimensional Cartesian space shown in FIG. 2B are all examples of sub-cubes within the OLAP cube defined by the three axes shown in FIG. 2B.

Figure 3:
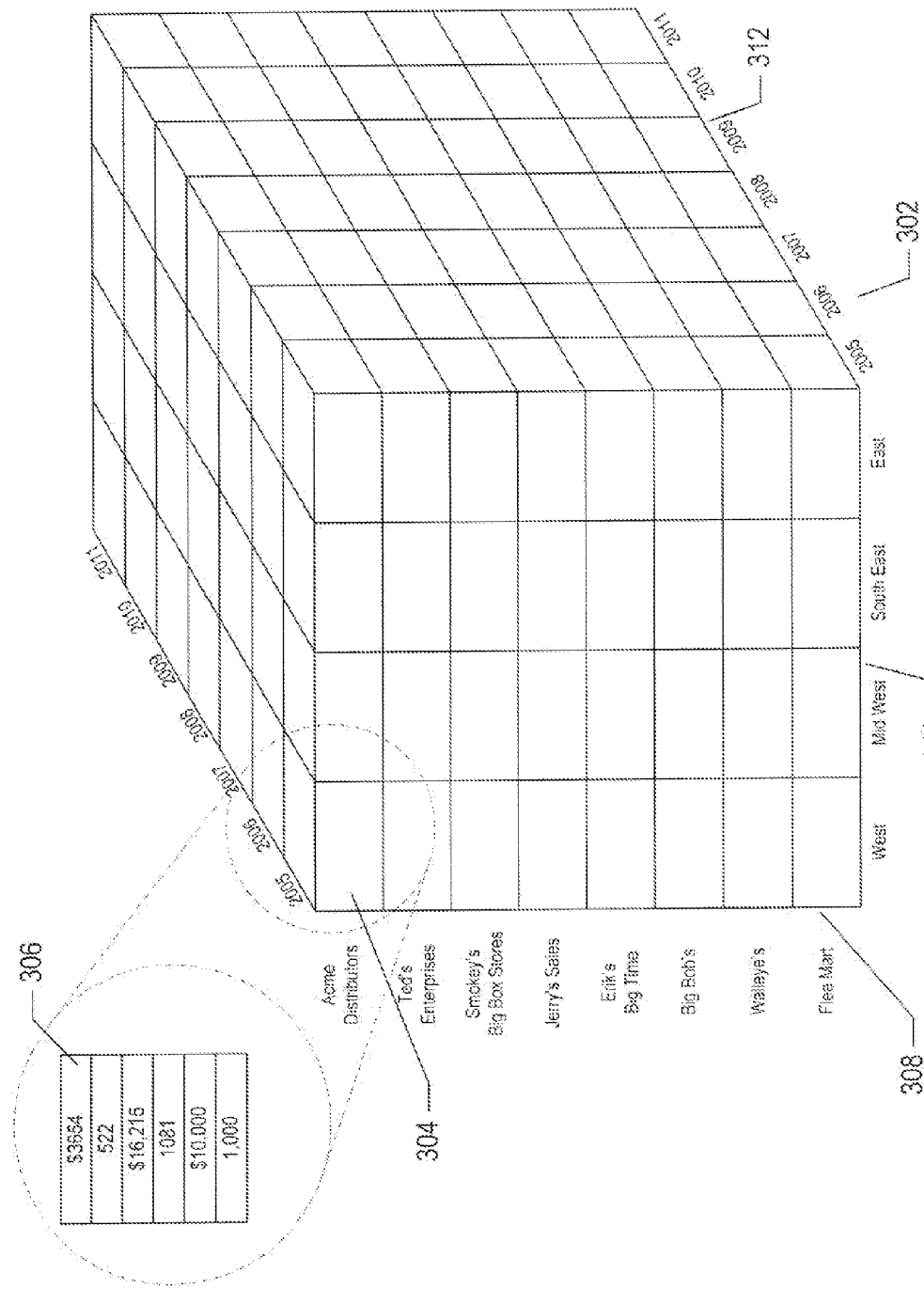
FIG. 3 illustrates an example cube used by OLAP applications and OPAL GUIs.

FIG. 3 illustrates an example cube used by OLAP applications and OLAP GUIs. The cube 302 represents all of the data values within a set of data values, such as a set of data values including those shown in FIG. 1. Each cell or element in the cube, such as cell 304, represents a set of measures, in the currently-described case, a set of six measures corresponding to the different types of measures that characterize the data values being organized into the cube. For example, the dollar amount 306 in field 304 is the dollar amount of widgets sold. The cube represents a volume in a coordinate space such as that shown in FIG. 2B. In the example cube 302, the left-vertical edge of the cube 308 corresponds to the customer/distributor axis, the bottom horizontal edge 310 represents regions, and the bottom edge 312 perpendicular to bottom edge 310 represents time-period. Cell 304 thus represents values for each of the different types of widgets sold to Acme Distributors in the west region during 2005, since the coordinates of this cell with respect to the three axes are: (1) west; (2) 2005; and (3) Acme Distributors. A three-dimensional cube was chosen for illustration convenience. OLAP cubes can have fewer dimensions or more dimensions, in the former case including lines and planes and in the latter case including hypercubes of various dimensionalities.

Figure 4:
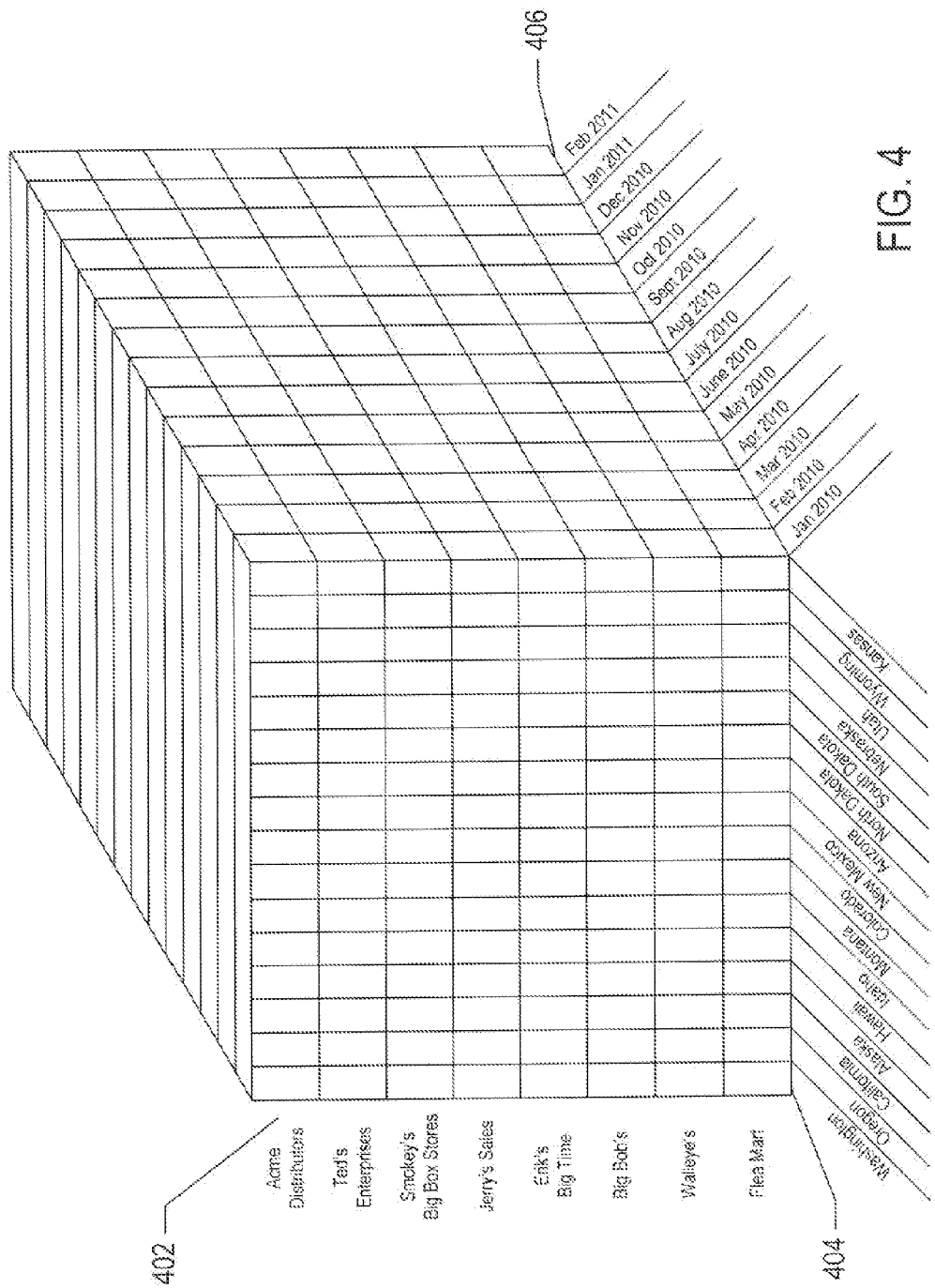
FIG. 4 shows an expanded view of a small portion of the cube shown in FIG. 3.

The OLAP-cube paradigm provides a basis for powerful data-analysis tools provided by OLAP applications to human users and analysts. As one example, the granularity at which each of the dimensions is incremented can be changed, to display different data. FIG. 4 shows an expanded view of a small portion of the cube shown in FIG. 3. In FIG. 4, the distributors/customers axis 403 is unchanged with respect to FIG. 3. However, the region axis has Finer-granularity increments and has been expanded over the portion of the region axis in FIG. 3 corresponding to the region "west". In FIG. 4, the region axis 404 is incremented into individual states within the west region. Similarly, the time-period axis 406 is now incremented in months, rather than years, and thus corresponds to an expanded view of a portion of the time-period axis 312 in FIG. 3 corresponding to the year "2010" and the first ⅙ of the portion corresponding to year "2011." Using cube-based data-manipulation tools, a user can focus, in microscope-like fashion, onto portions of a lower granularity cube to display data at higher granularity with respect to one or more dimensions.

Figures 5A, 5B:
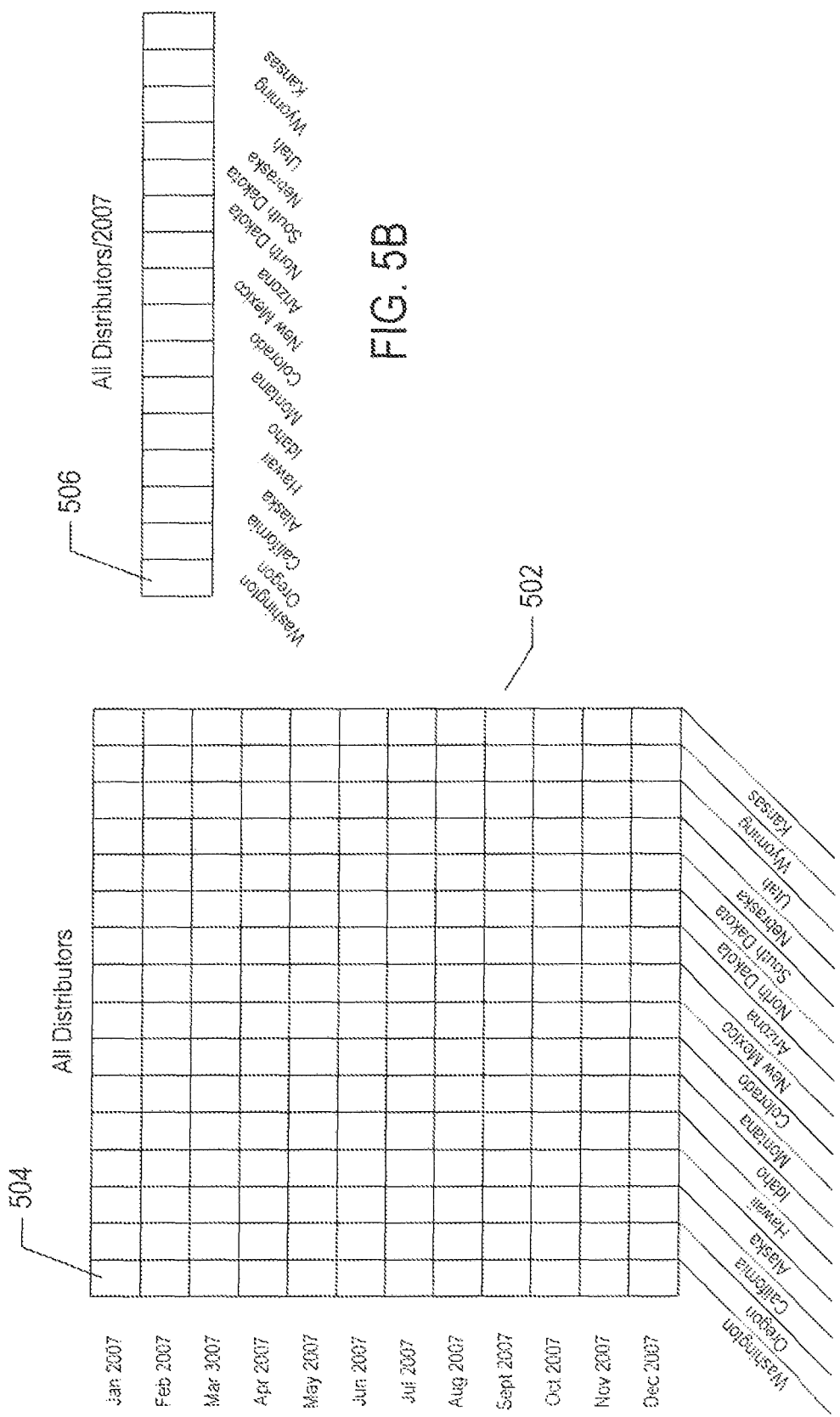
FIGS. 5A-B illustrate two different projections of data within the cube shown in FIG. 4.

In addition, a user or analyst can project data onto lower dimensional regions. FIGS. 5A-B illustrate two different projections of data within the cube shown in FIG. 4. In FIG. 5A, all of the data in a vertical column of cells parallel to the distributor/customers axis 304 having region coordinate "west" and time-period coordinate "2007" within the cube 302 shown in FIG. 3 have been projected into a two-dimensional projection 502 with expanded granularity with respect to time period and region. A particular cell in this two-dimensional projection, such as cell 504, represents total dollar amounts and numbers of widgets, shiny widgets and star widgets sold in a particular month of 2007 in a particular state to all distributors and customers. FIG. 5B shows a further projection of the two-dimensional projection 502 of FIG. 5A to one dimension. In this case, each cell, such as cell 506, represents the dollar amounts and total numbers of widgets, shiny widgets and star widgets sold during 2007 to all distributors/customers within a particular state.

The manipulation of data illustrated in FIG. 3-513 are representative of the immense visualization power provided by the cube paradigm for viewing and comprehending large sets of data. Ultimately, the complete underlying data set can be considered to be a cube in which each dimension is incremented at the highest possible granularity. For example, an organization may have collected data with respect to the dollar amounts and numbers of widgets, shiny widgets and star widgets sold to individual employees within distributor/customer organizations within each township or city of the United States, on a per-day basis. Thus, at highest granularity, the customer/distributor axis of he corresponding OLAP cube would be incremented by individual employee, the region axis would be incremented by township or city, and the time-data axis incremented by day. Clearly, this data set can be massive, containing well over a billion individual sales figures for a 10-year period for a modest number of distributor/customer organizations over the United States.

Figure 6:
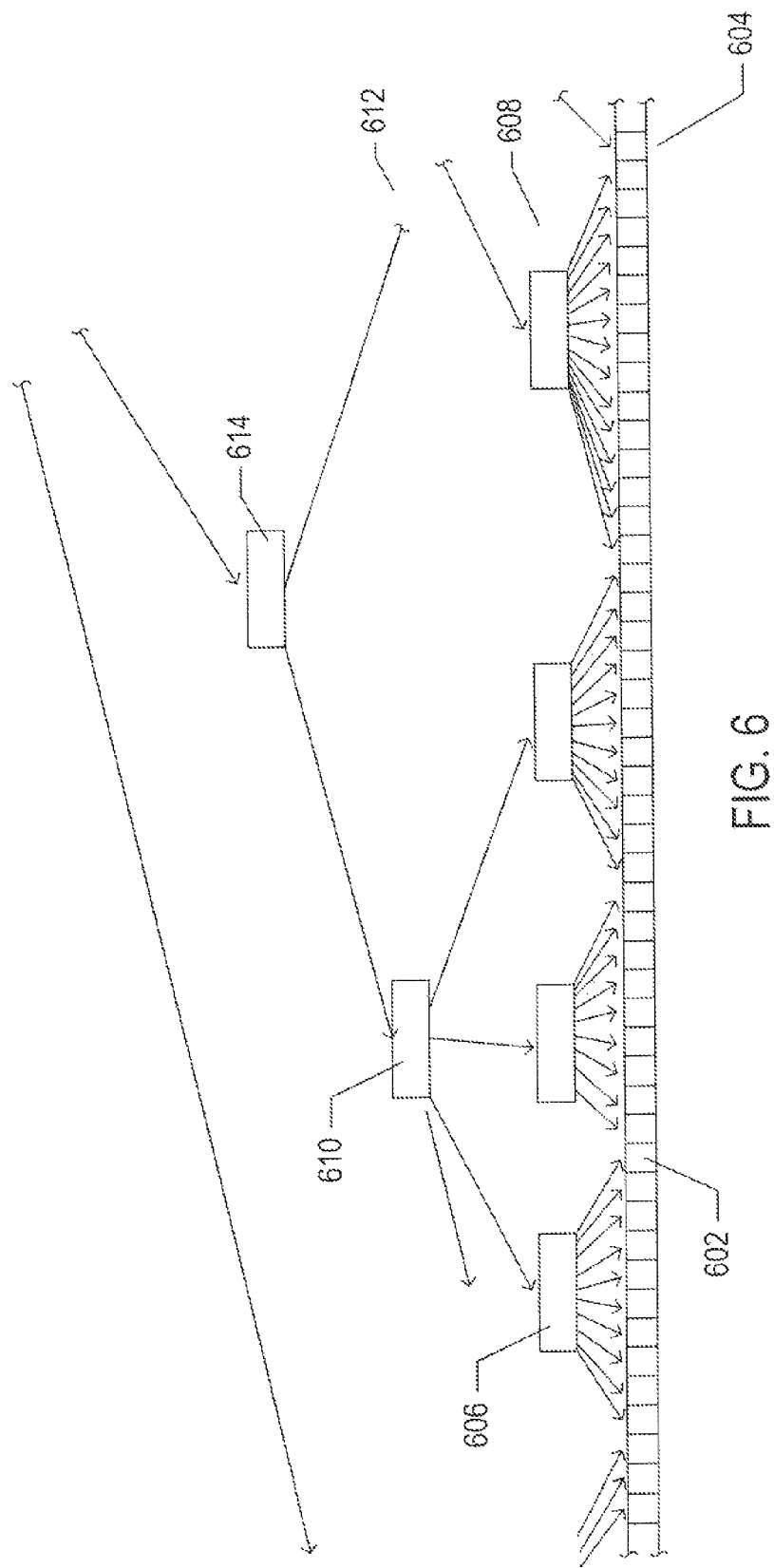
FIG. 6 shows a small portion of a tree-like representation of the region axis of the cube shown in FIG. 3.

In general, along each dimension of a cube, discussed above, there may be many different granularities at which the data can be displayed. The granularities for display of a dimension can be represented in tree-like fashion. FIG. 6 shows a small portion of a tree-like representation of the region axis of the cube shown in FIG. 3. At the lowest level, or highest-granularity, region information is available for particular townships and cities. At the lowest level, each increment along the region axis, represented by small rectangles in FIG. 6, such as node 602, represent sales figures for a particular township or city. The townships and cities can be grouped together within larger regions corresponding to counties. Thus, county nodes, such as the county node 606, include, or aggregate, data for those particular townships and cities within a country, forming a second level 608 within the tree. The counties can be, in turn, aggregated together to form states, such as the state represented by node 610 in FIG. 6. Thus states form a third level 612 which can be displayed using the cube paradigm. States can be further aggregated to form regions, such as a region represented by region node 614. In FIG. 3, the states within the United States are aggregated into four regions: West, Midwest, Southeast, and East. Finally, the regions can be aggregated together to project all of the data onto a subcube that does not include a region dimension. This highest level of aggregation is presented by a root note within the tree-like representation of the various levels of granularity for the region axis shown in FIG. 6.

Figure 7:
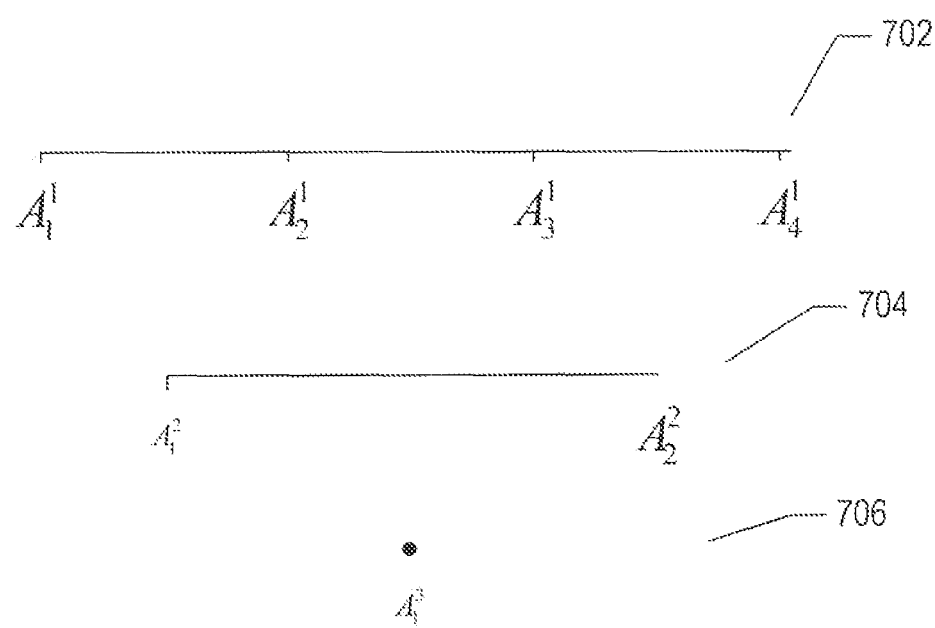

FIGS. 7-11 illustrate a small example set of OLAP cube data. In this example, there are four different dimensions, labeled "A", "B", "C" and "D". In the example illustrated in FIGS. 7-11, each dimension, at lowest granularity, has four different values. FIG. 7 illustrates the data values associated with dimension A. The finest-granularity view of dimension A 702 shows four different highest-granularity values $A_1$, $A_2^1$, $A_3^1$, $A_4^1$. In the example of FIG. 7, at a second-granularity level, values $A_1^1$ and $A_2^1$ are summed together to produce to second-level value $A_1^2$ and values $A_3^1$ and $A_4^1$ are summed together to produce the second-level value $A_2^2$, the second level 704 therefore having two values. At a third-level of aggregation 706, a single value $A_1^3$ that is obtained by summing the two second-level values $A_1^2$ and $A_2^2$. This third-highest level for dimension A and similar highest levels for dimensions B-D represents the "all" level, corresponding to a projection parallel to a dimension to produce a lower-dimensional subspace generally orthogonal to the dimension.

Figure 8:
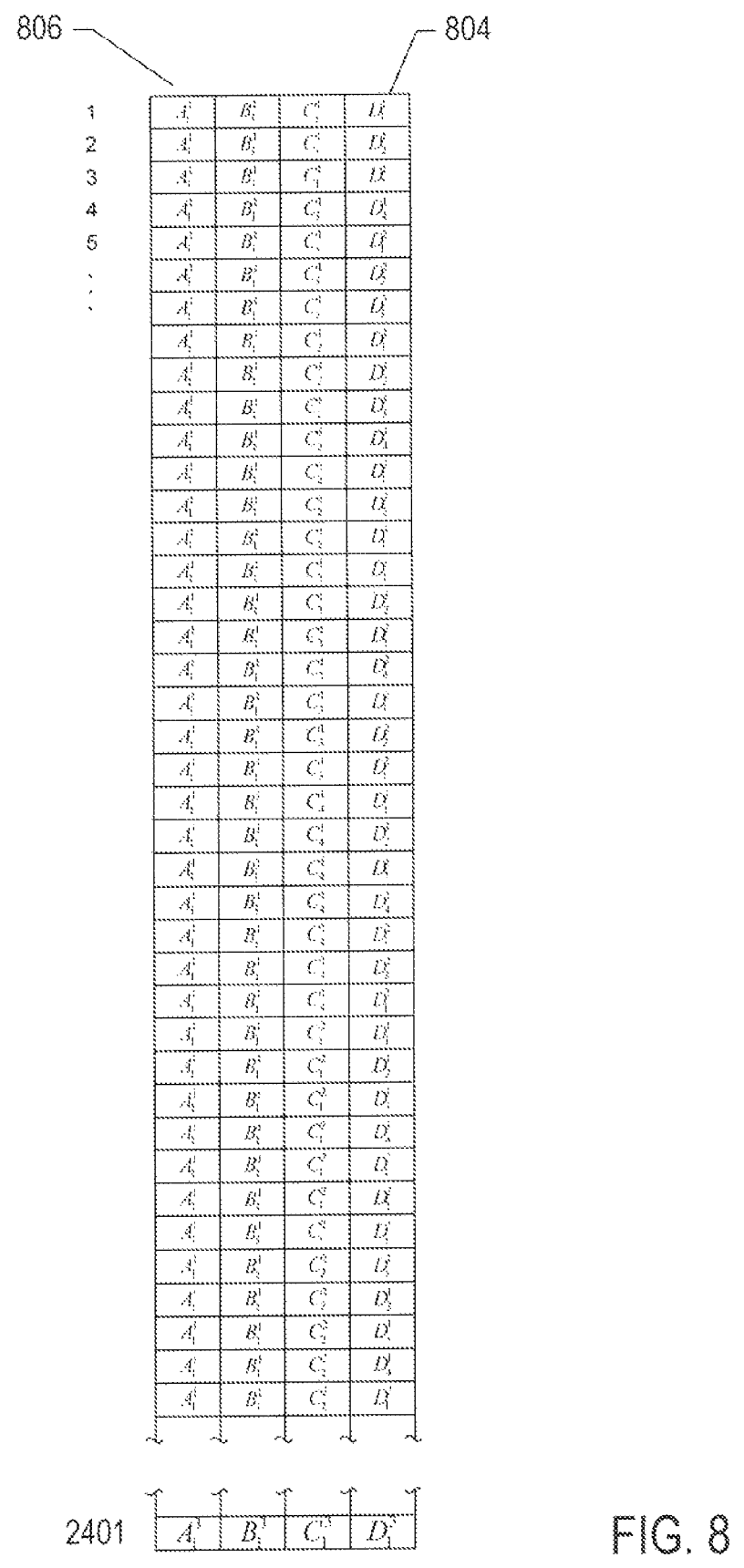

FIG. 8 shows a table containing all possible OLAP-cube data values for the example of FIGS. 7-11. There are a total of 2,401 different possible combinations of values with respect to the four dimensions A-D. In the enumeration of the possible data values in FIG. 8, the sub-values with respect to dimension D, shown in the final column 804, change most quickly while the values corresponding to dimension A, in the first column 806, change least quickly.

Figure 9:
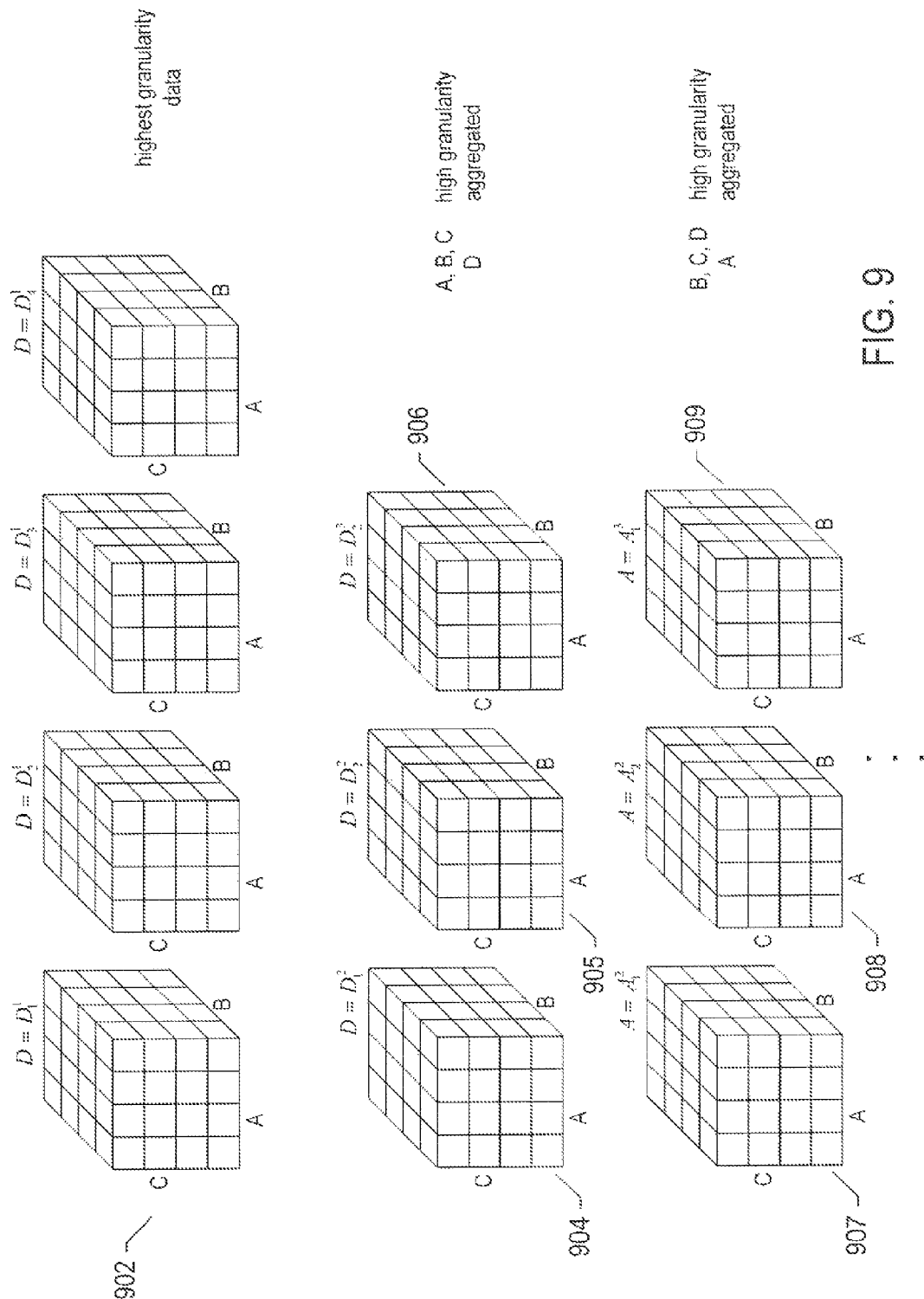
Figure 10:
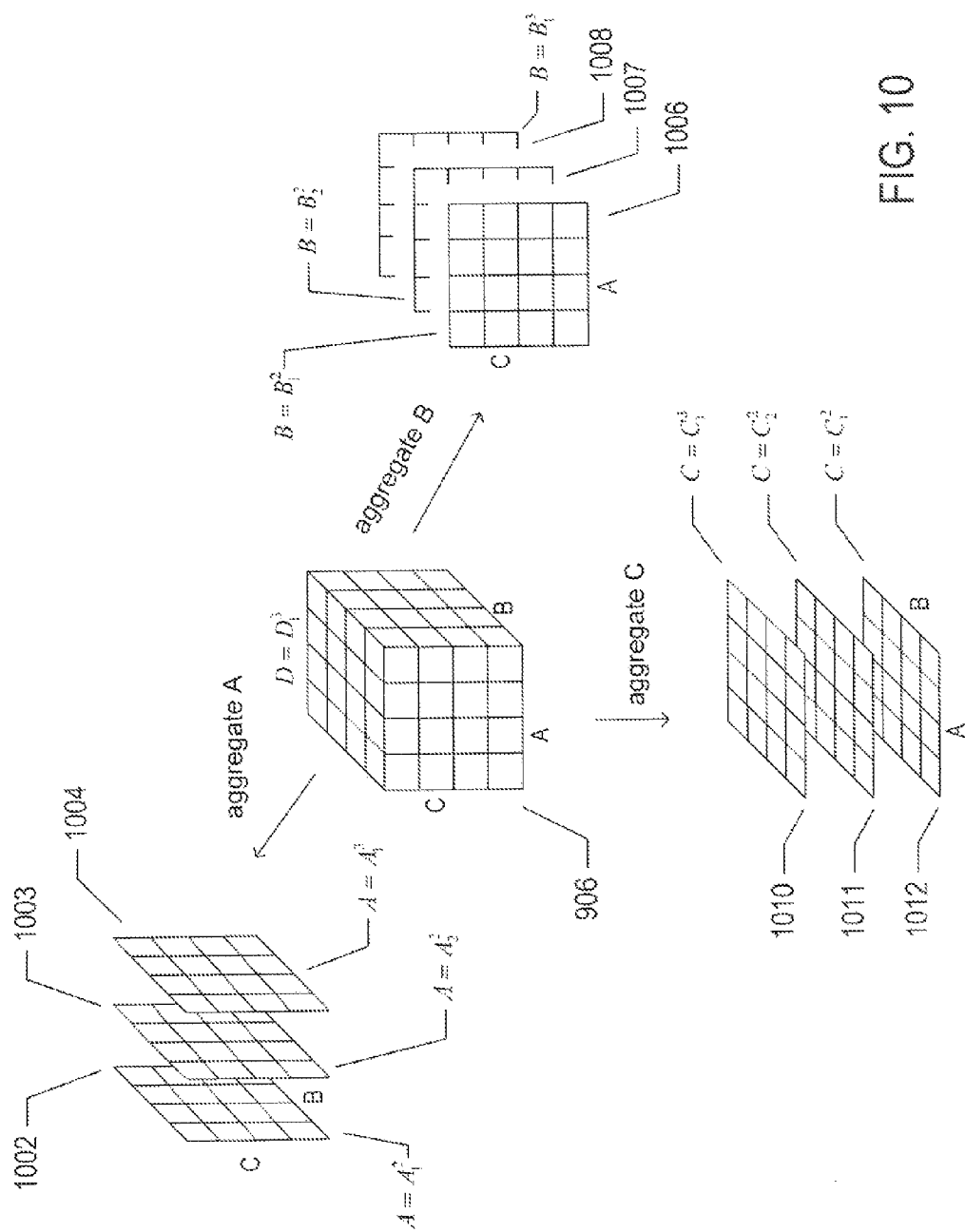
Figure 11:
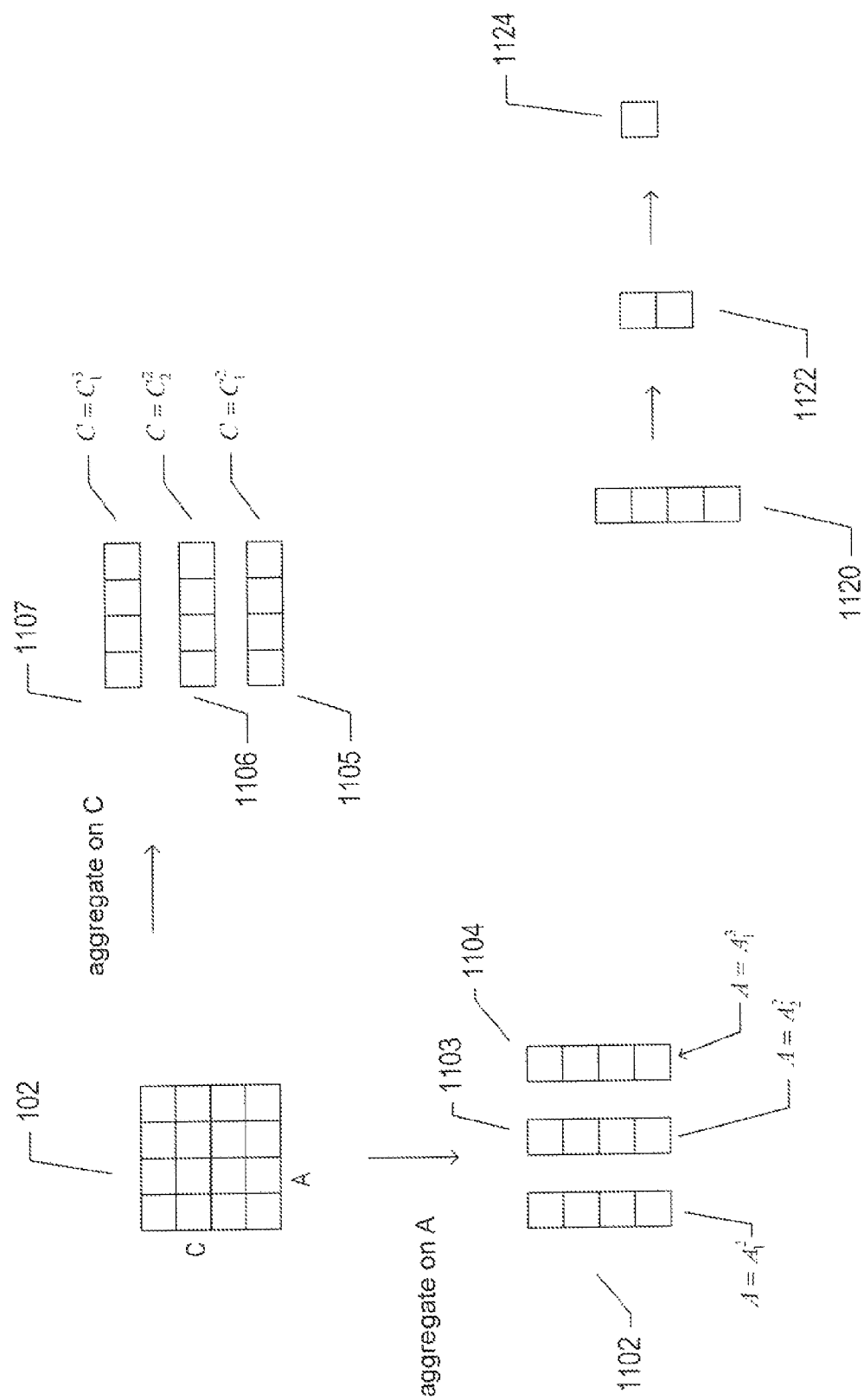

FIGS. 9-11 illustrate various different representations of the OLAP cube data. In a first row 902 of FIG. 9, four three-dimensional cubes represent all of the highest-granularity data. Each cube represents the three dimensions A-C as well as a single fixed value for dimension D. As discussed above with reference to FIG. 7, the data may be aggregated with respect to each dimension to produce two second-level values and a single third-level value. There are an additional 12 cube representations corresponding to data aggregated with respect to a single dimension. Six of these 904-909 12 cubes are shown in FIG. 9. Cube 904, for example, represents aggregation with respect to dimension D, where the value for the D dimension is the first, second-level value D. Cube 906, as a second example, represents a three-dimensional projection of the four-dimensional highest-granularity data along the D axis, in which the corresponding data values of the four cubes in the top row of FIG. 9 902 are added together to produce cube 906. FIG. 10 illustrates further aggregation of the three-dimensional projection of the highest granularity data along the D axis. Cube 906 of FIG. 9 is shown at the center of FIG. 10. Further aggregation of the three-dimensional data projection represented by cube 906 by projection along dimension A produces three different possible two-dimensional projections 1002-1004. Further aggregation of the three-dimensional data projection represented by cube 906 by projection along dimension B dimension produces three different possible two-dimensional projections 1006-1008. Further aggregation of the three-dimensional data projection represented by cube 906 by projection along dimension C axis produces three possible two-dimensional projections 1010-1012. As shown in FIG. 11, a given two-dimensional project 1102 can be further projected along one of the two axes to produce one-dimensional projections, or vectors 1102-1107. Finally, as also shown in FIG. 11, a one-dimensional vector 1120 at highest-granularity with respect to the remaining dimension can be aggregated twice to produce a shorter 2-element vector 1122 and a final value 1124 that represents a four-dimensional projection of the OLAP cube data onto a single set of measures. In the example of FIGS. 3-5, this highest possible aggregation is equivalent to six total sales figures, in dollars and numbers of units, for widgets, shiny widgets, and star widgets over all regions and all possible time periods to all distributors and customers.

Figure 12:
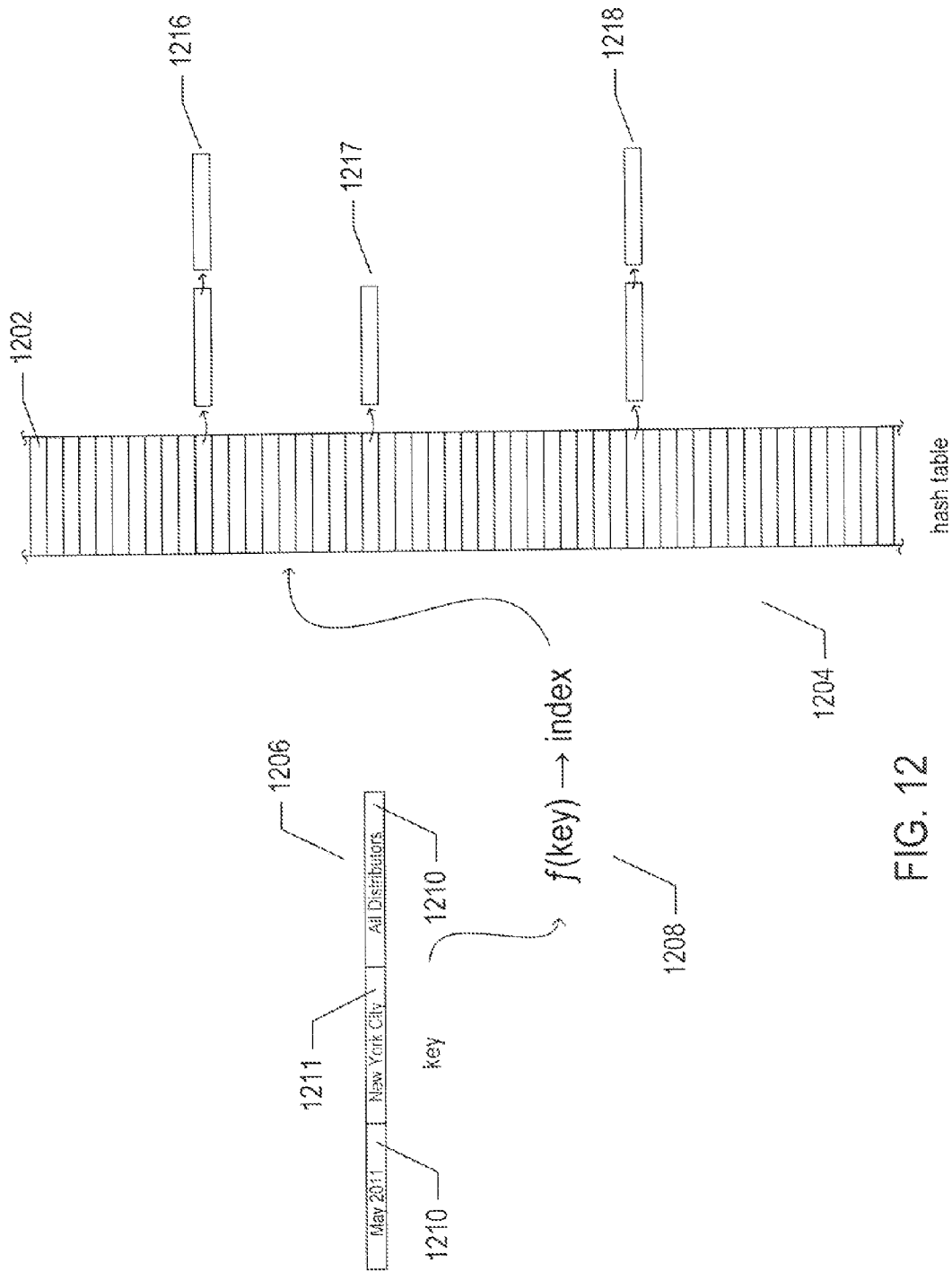
FIG. 12 illustrates a hash-object representation of ML/MD data for an OLAP application.

FIG. 12 illustrates a hash-object representation of ML/MD data for an OLAP application. As shown in FIG. 12, each set of measures, such as the set of measures shown in FIG. 2A, can be stored in entries within a hash table, such as entry 1202 in hash table 1204 shown in FIG. 12. Conceptually, a hash table is a linear array of objects indexed by a hash function. The sub-values corresponding to the dimensions of the group of ML/MD data can be concatenated together in a specific order to form a key 1206. The key is input to a hash function 1208 which outputs an integer index into the hash table 1204 that represents the position of the object within the hash table associated with the dimension-associated sub-values used to construct the key. The dimension-associated sub-values can reflect the level of aggregation with respect to each dimension. For example, in the key 1206 shown in FIG. 12, constructed from sub-values taken from the example of FIGS. 3-5B discussed above, each element 1210-1212 corresponds to a different dimension of the three dimensions time-period, region, and distributor/customer. The string ("ALL Distributors") in position 1212 corresponding to the distributors/customers dimension indicates that the desired data to be accessed through the key is aggregated to the highest level with respect to the distributors/customers dimension or, in other words, projected along this dimension to produce a two-dimensional subset of the three-dimensional data. The value "May 2011" in element 1210 corresponding to the time-period dimension indicates aggregation with respect to the time-period dimension to the level of months. The string "New York City" in the second element 1211 of the key indicates that the highest granularity data with respect to the regional dimension is desired. Applying key 1206 to the hash function generates the index of a set of measures that represent the dollar-amount and number sales of Widgets, shiny widgets and star widgets to all distributors and customers in New York City during May of 2011. This set of measures is an element in a two-dimensional projection of the three-dimensional data, such as that shown in FIG. 5A, at higher resolution or granularity with respect to the region axis than the projection shown in FIG. 5A. All of the highest-granularity and various aggregated data values that compose an ML/MD data set can be included in a single hash object associated with a hash function returning an index into the hash table based on well-formed keys in which the value and aggregation level with respect to each dimension is indicated. The hash tables generally support collision-bucket chains, such as collision-bucket chain 1612-18 shown in FIG. 12, to accommodate multiple different data objects for which the hash function returns a single, common index in response to input of one of multiple different well-formed keys corresponding to multiple measure sets. These collisions chains can be logically folded within a single linear array by various hash-object implementations. A hash object that includes a hash table, hash function, set of rules for constructing well-formed keys is an attractive container for ML/MD data because hash objects are relatively compactly stored in memory and exhibit very fast access times.

Many different methods and systems have been employed for organizing and storing ML/MD data for OLAP applications and graphical user interfaces, including graphical user interfaces that allow users to manipulate and display data according to the OLAP-cube paradigm. In certain implementations, relational database tables are used for storing underlying ML/MD data. Unfortunately, ML/MD data does not efficiently map to relational tables. Furthermore, data-access requests and data returned in response to data-access requests passes through many interfaces within RDBMSs employed to store ML/MD data on behalf of OLAP applications and graphic user interfaces.

Figure 13A:
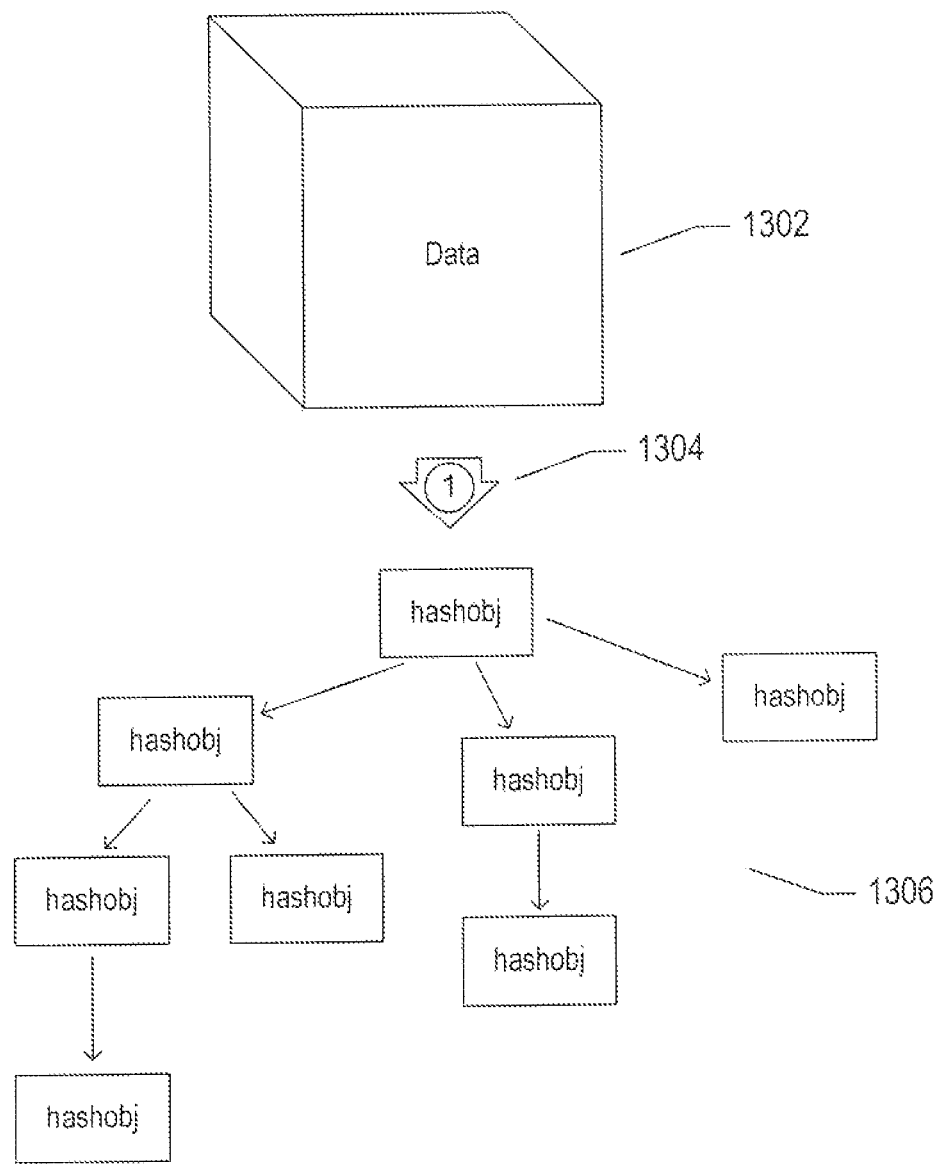
FIGS. 13A-B and 14 illustrate high-level features and characteristics of a DMS that represents one embodiment of the efficient DMSs to which the present application is directed.
Figure 13B:
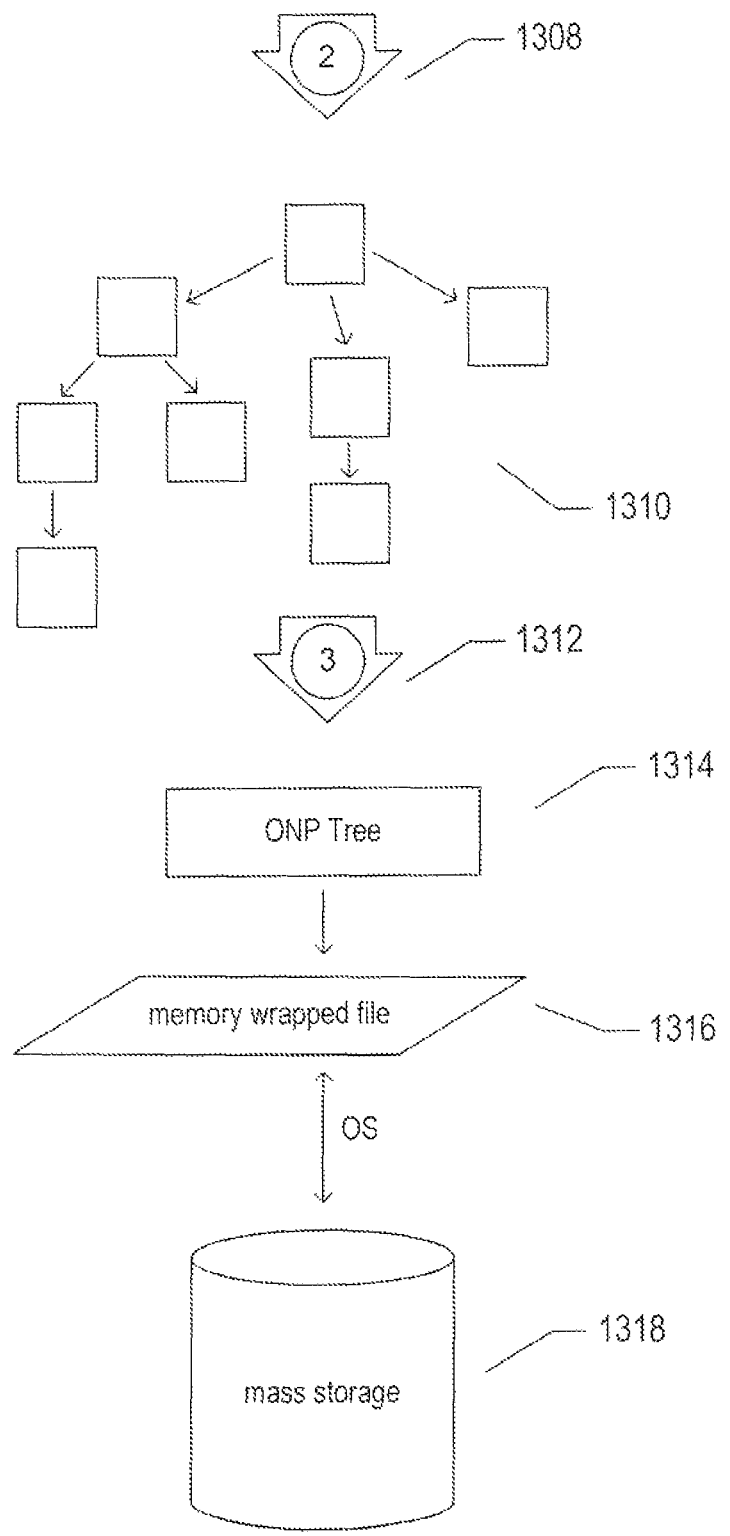
Figure 14:
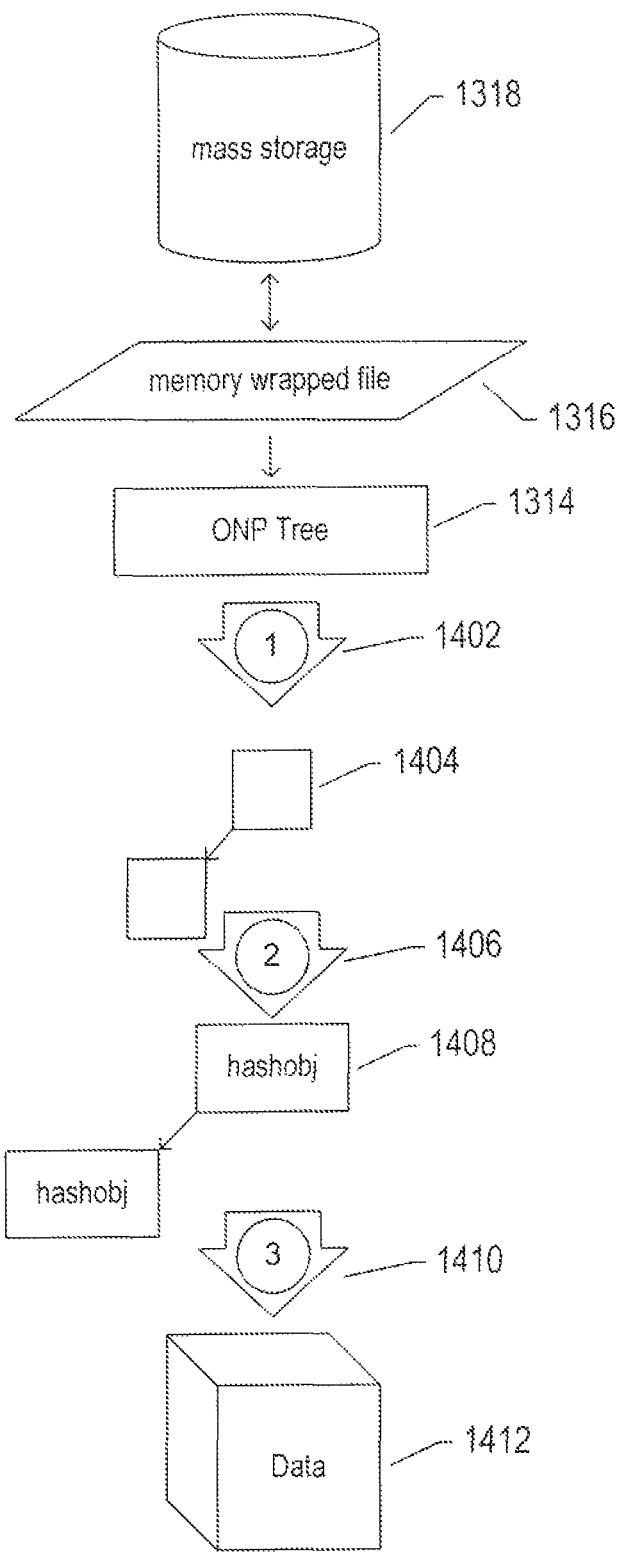

The present application is directed to a new, efficient data-management system ("DMS") for organizing, storing, and retrieving ML/MD data. FIGS. 13A-B and 14 illustrate high-level features and characteristics of a DMS that represents one embodiment of the efficient DMSs to which the present application is directed. FIGS. 13A-B illustrate processing and storage of ML/MD data by a DMS that presents an example embodiment. In FIG. 13A, the ML/MD data is represented by a large cube 1302. This is all of the highest-resolution data and the various levels of aggregated data with respect to the dimensions by which the ML/MD data is characterized.

In a first step 1304, the ML/MD data is partitioned and stored within hash objects that are organized into a tree-like structure of hash objects. The tree-like organization of hash objects 1306 is described, in greater detail, below. In a second step 1308, continuing on to FIG. 13B, the hash objects are serialized and compressed, using any of various well-known serialization and compression methods, such as Java serialization methods and Lempel-Ziv data compression, or other serialization and/or compression methods, to produce compact serialized and compressed hash objects within a much smaller, compressed version of the tree-like structure 1310. In a third-step 1312, the materialized and compressed hash objects are packaged within an ordered-nested-partition-tree ("ONP tree") data structure 1314 which is written to a memory-mapped file ("MMF") 1316 which, under operating-system control migrates back and forth from electronic memory, where the ONP tree can be selectively accessed by DMS routines, to one or more mass storage devices 1318 within a computer system where the compressed ONP tree is persistently stored. A second compression of the ONP-tree data structure may be carried out, in certain implementations, prior to writing the ONP-tree data structure to an MMF. The MMF is partitioned between random access memory and mass storage devices in a fashion similar to virtual memory, and may be implemented using portions of the virtual-memory subsystem of an operating system executing within a computer system. Recently accessed data, and data predicted to be soon accessed, migrates from mass storage to the in-memory portion of an MMF under operating system control. Hash objects suitable for storing portions of the ML/MD data are commercially available, including JAVA hash objects.

FIG. 14 illustrates a process by which ML/MD data stored within a data-management system is accessed for use by OLAP applications and GUIs according to one embodiment. As discussed above, the ONP-tree data structure is stored in memory, generally partitioned between mass storage devices 1318 and in-memory portions 1316 of MMFs. As also discussed above, the ONP-tree data structure 1314 is stored in compressed form. When some portion of the ML/MD data is desired for manipulation and display by OLAP applications and/or GUIs, in a first step 1402, the relevant portion of the tree-like data structure of serialized and compressed hash objects is extracted from the ONP-tree data structure 1404. In a second step 1406, the serialized and compressed hash objects are decompressed and instantiated to produce a sub-tree of hash objects 1408 that includes the desired ML/MD data. In a third step 1410, the hash objects are merged to produce a final hash object, or other data container, in memory that can be accessed by the OLAP applications and/or GUIs to obtain the needed data 1412 for manipulation and display.

Figure 15:
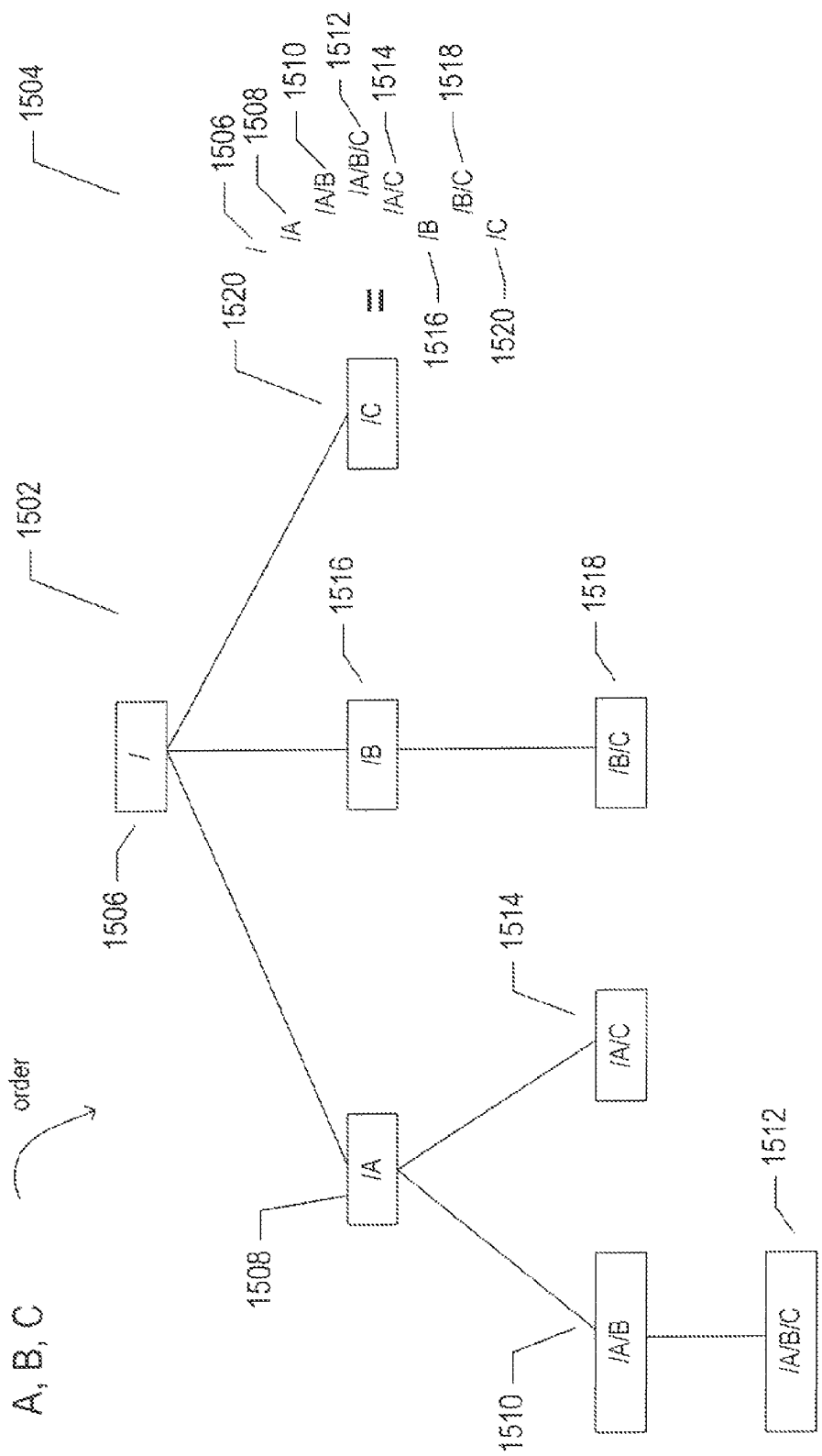
FIGS. 15 and 16 illustrate two examples of tree-like partitioning of ML/MD data employed in an efficient data management system that represents an embodiment of the efficient data management systems to which the present application is directed.
Figure 16:
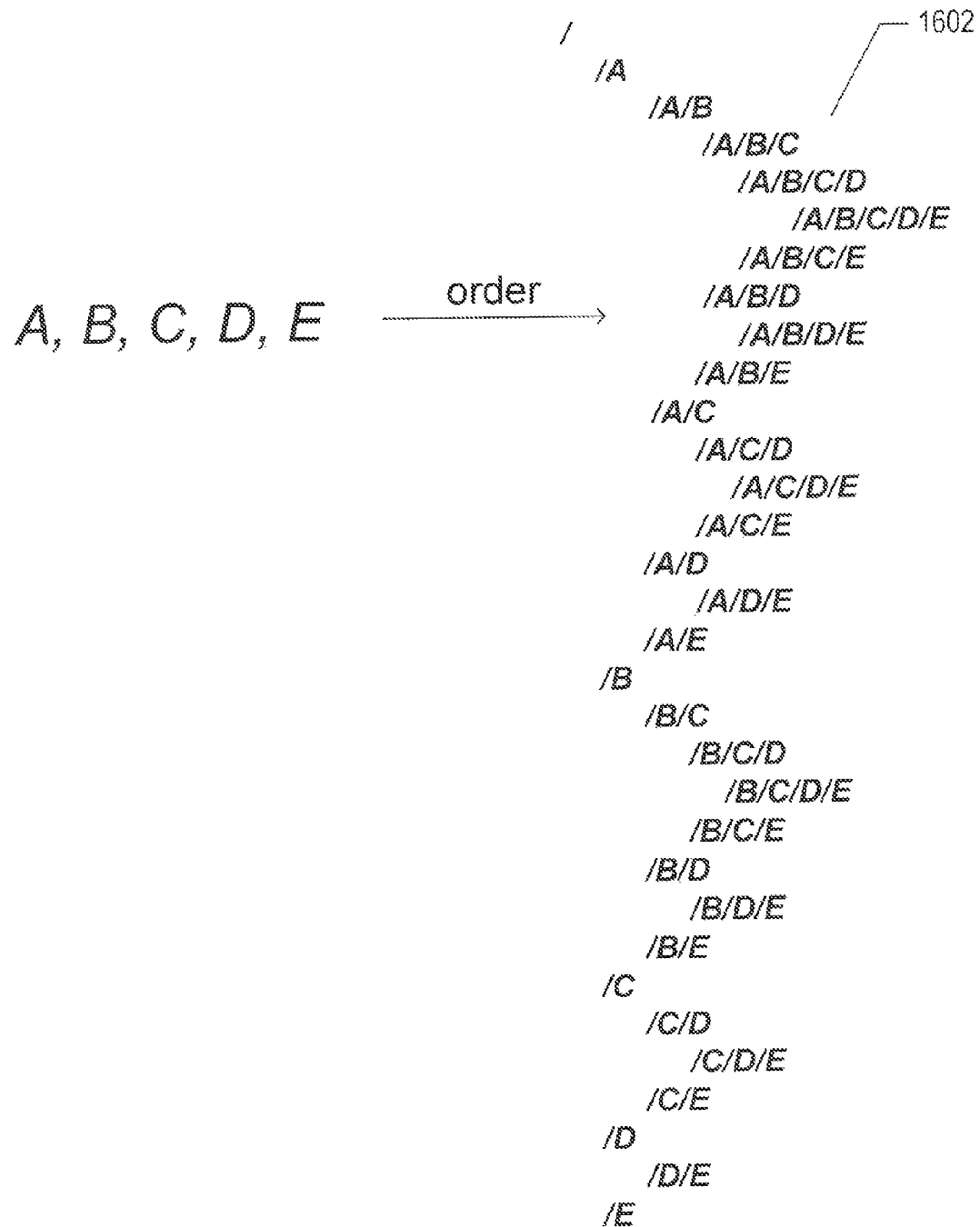

FIGS. 15 and 16 illustrate two examples of tree-like partitioning of ML/MD data employed in an efficient data management system that represents an embodiment of the efficient data management systems to which the present application is directed. The ML/MD data contains data related to three dimensions A, B and C. Ordering of the data with respect to these three dimensions produces the tree-like data structure 1502. This data structure can be more succinctly represented without using graph edge and node representations, as shown on the right hand side of FIG. 1504. The root node 1506, designated ("/") contains all of the highest-granularity ML/MD data, and may also contain various highest levels of aggregated data. For example, in the example of FIGS. 9-11, the root node would include the four cubes in the first row 902 of FIG. 9 as well as at least 8 additional cubes, including cubes 904-905 and 907-908. However, cubes 906 and 909, and similar cubes that represent the highest level of aggregation or dimensions B and C, are not included, in certain implementations. The first second-level node 1508 contains the highest-granularity ML/MD data projected onto a two-dimensional subcube with dimensions B and C. This node contains the ML/MD data that would be obtained by generating all possible keys having the dimension A set to "ALL" and using these keys to retrieve sets of measures from a hash object corresponding to the root node. The third-level node 1510 is obtained from the ML/MD data contained in node 1508 by projecting that data along dimension B. The first fourth-level node 1512 contains the ML/MD data contained in node 1510 further projected along dimension C. This node would contain a single set of measures. The second third-level node 1514 contains that portion of the ML/MD data of node 1508 that is not also contained in node 1510, further projected with respect to the C dimension. The second first-level node 1516 contains that portion of the data of the root node 1506 that is not also stored within node 1508, projected with respect to the B dimension. The third-level node 1518 includes the ML/MD data of node 1516 further projected with respect to the C dimension. The third second-level node 1520 includes the ML/MD data of the root node 1506 that is not also included in either of nodes 1508 and 1516, further projected with respect to the C dimension.

FIG. 16 shows a tree-like partitioning of ML/MD data related to five dimensions A, B, C, D, and E employed in an efficient data management system that represents an embodiment of the efficient data management systems to which the present application is directed. The contents of each node in the 5-dimensional partitioning 1602 can be derived in similar fashion to the above-discussed derivation of the contents of the nodes the tree-like data structure 1502 and 1504 shown in FIG. 15.

Figure 17:
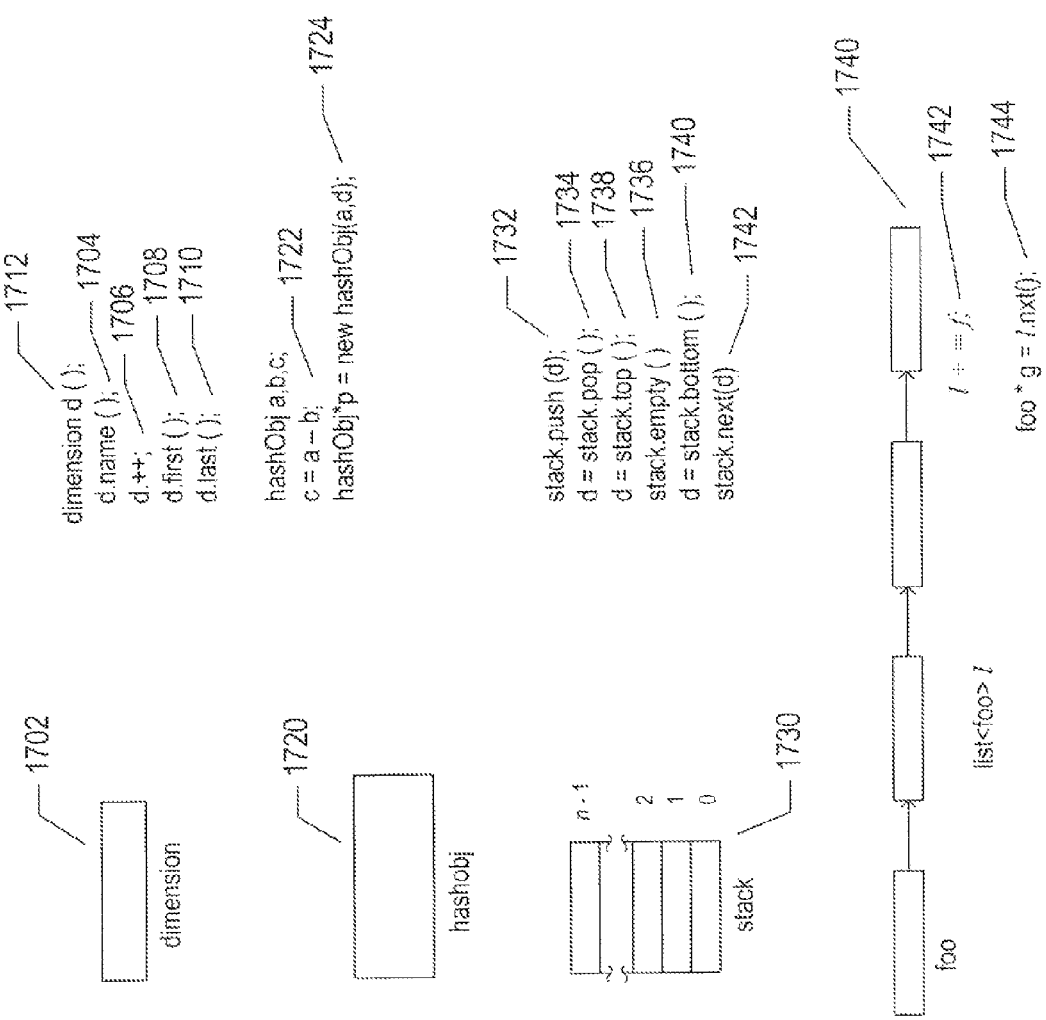

FIGS. 17 and 18 illustrate generation of hash objects that represent nodes in the tree-like data structure, described above with reference to FIGS. 15 and 16, employed in an efficient data management system that represents an embodiment of the efficient data management systems to which the present application is directed. FIG. 17 shows various data structures employed in a pseudocode implementation of the partitioning method. The pseudocode employs a dimension object 1702 to represent the dimensions with respect to which the data is partitioned. The dimension object represents the ordered sequence of dimensions that define keys, as discussed above, used to obtain hash-table indexes via a hash function. At any point in time, the dimension object represents one of the dimensions. Dimension-object member functions include a member function 1704 that returns a name, or a character string representation, of the dimension currently represented by the dimension object, post-increment 1706 and pre-increment operators that advance the dimension represented by the dimension object, first and last member functions 1708 and 1710 that return Boolean values indicating whether the dimension object currently has the value of the first dimension and whether the dimension object currently has a value of the last dimension in the order of dimensions used for key construction, and a constructor 1712 that initializes the dimension object to represent the first dimension in an ordered sequence of dimensions. The pseudocode additionally uses hash objects 1720 to store ML/MD data. Hash objects support a set difference operator 1722 as well as a constructor that constructs a new object to include a projection of the data in an already existing hash object with respect to a particular dimension 1724. The pseudocode additionally uses a stack object 1730 that stacks dimension objects, which features traditional stack member functions including push 1732, pop 1734, and empty 1736. This stack also supports top and bottom member functions 1738 and 1740 that return copies of the top and bottom dimension objects on the stack without removing them as well as a member function next 1742 used to traverse the contents of the stack without removing dimensions. Finally, the pseudocode uses a list type 1740 for storing a list of partition-node names and a list of hash objects. The list type supports appending objects to the list via an appending operator 1742 as well as traversal member functions 1744.

FIG. 18 provides pseudocode for generating the ML/MD partition according to certain embodiments. An initial hash object contains the full ML/MD dataset 1802. The pseudocode, as discussed above, uses a stack object 1804, a first list of hash objects 1806, and a second list of node names 1808. The pseudocode includes a partition function 1810, defined on lines 5-31, which generates hash objects corresponding to all nodes below the root node of a partition tree used to generate the ONP-tree data structure. The highest-granularity ML/MD data hash object 1802 is supplied as the initial argument to the first call to the partition function. The partition function is recursive. When the stack is empty, the first dimension is pushed onto the stack on line 12. Otherwise, when the last dimension pushed onto the stack is the last of the dimensions with respect to which the ML/MD data is being partitioned, the recursion terminates on line 13. Otherwise, a new dimension is pushed onto the stack that succeeds, in the dimension order, the current top dimension on the stack. In the do-while loop of lines 16-30, all of the ancestor nodes of the already-created node input to the current invocation of the partition function are created. On line 18, a new hash object is created. On lines 19-23, the new hash object is appended to the list of hash objects and the name of the node associated with the new hash object is created and entered into the list of node names. On line 24, a recursive call to the partition function is made to generate the ancestors of the new node. On lines 25-28, a set difference is computed and the stack adjusted in order to prepare for the next iteration of the do-while loop.

The list of hash objects is aligned with the node names formatted according to the convention for describing ONP-trees, shown in, and discussed with reference to, FIGS. 15 and 16. Thus, the lists represent a serialization of the partition tree that would be obtained by traversing a symbolic representation of the partitioning of ML/MD data, used in certain implementations of the DMSs to which the current application is directed, from the root node down to the final node of the tree. These two lists allow for a straightforward linear traversal in order to serialize, compress, and store the hash nodes, in a well-defined order, into the ONP-tree data structure.

Figure 19:
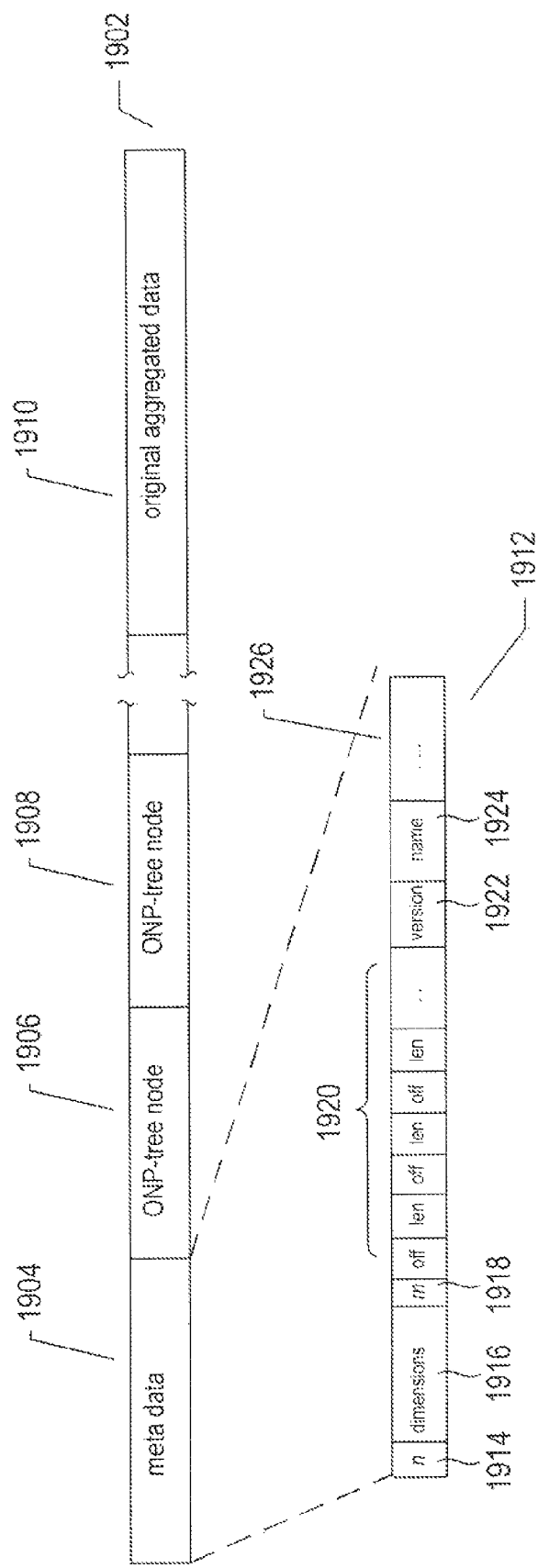
FIG. 19 illustrates example ONP-tree data structure employed in an efficient data management system that represents an embodiment of the efficient data management systems to which the present application is directed.

FIG. 19 illustrates an example ONP-tree data structure employed in an efficient data management system that represents an embodiment of the efficient data management systems to which the present application is directed. The UNP-tree data structure includes a meta-data header 1904, the serialized and compressed hash-object nodes of a partition tree, in a well-defined tree-serialization order 1906, 1908, etc., and a final serialized and compressed hash object that stores the initial highest granularity and aggregated ML/MD data 1910. The meta-data field 1904 is further subdivided into numerous meta-data fields 1912, including a field that indicates the number of dimensions 1914, a list of the dimension names 1916, the number of non-root partition-tree nodes 1918, offset and length fields for each of the partition-tree nodes 1920, a version number 1922, an UNP-tree name 1924, and other such fields 1926 describing characteristics of the ONP-tree. A variety of alternative formats and encodings for ONP-tree data structures may be used in alternative embodiments, including alternatives in which the order of the fields is altered and in which additional and/or different types of meta-data are included. Multiple ONP trees can be serialized and compressed for storage within a single ONP-tree data structure, in alternative implementations.

The ONP tree contains the highest-granularity ML/MD data and various aggregated ML/MD data as well as various projections of the ML/MD data and various aggregated ML/MD data. An OLAP application or an OLAP graphical user interface can efficiently retrieve a particular subcube of an OLAP cube by reconstructing the subcube from hash-object nodes of the ONP tree. As one example, were the subcube BCD of the five-dimensional ML/MD data discussed with reference to FIG. 16 desired, the node labeled /A/E would be extracted, decompressed, and deserialized to provide a hash object containing the subcube data. As another example, were the subcube BCDE desired, node labeled /A would be extracted, decompressed, and deserialized to provide a hash object containing the subcube data. In certain cases, two or nodes would be extracted, decompressed, deserialized, and merged to provide a hash object containing the desired subcube data.

Although the present invention has been described in terms of particular embodiments, it is not intended that the invention be limited to these embodiments. Modifications will be apparent to those skilled in the art. For example, many different embodiments of the efficient data-management systems and methods that represent present embodiments can be implemented by varying any of many different implementation parameters, including programming language, operating system, data structures, control structures, modular organization, type of memory-mapped function or other facility for persistent storage and access via random-access memory, and the type of containers, such as the above-described hash objects, used to storing ML/MD data partitions. Various types of well-ordered key composition methods and related hash functions can be devised for accessing ML/MD data stored hash objects.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A data management system comprising:
a computer system that includes one or more processors, one or more electronic memories, and a memory-mapped file facility that electronically stores data;
an ordered, nested, partition-tree ("ONP-tree") data structure stored as a memory-mapped file by the memory-mapped file facility; and
data management system control routines, executed by the one or more processors, which retrieve a particular projection of a multi-level, multi-dimension data set stored within the ONP-tree data structure that contains the multi-level, multi-dimension data set,
in which each node of the ONP-tree data structure corresponds to a data container that stores a portion of the multi-level, multi-dimension data set, and
in which each of the data containers corresponding to a direct ancestor node of a higher-level ONP node contains a projection of the data stored in the higher-level ONP-tree node;
wherein the ONP-tree data structure comprises:
meta-data; and
a serialized and compressed ONP tree, the serialized and compressed ONP tree comprising a number of serialized and compressed hash objects within the ONP-tree data structure.

2. The data management system of claim 1 wherein the ONP-tree data structure includes a root node and additional levels of lower-level nodes that together compose an acyclic graph.

3. The data management system of claim 1 wherein each of the data containers corresponding to a right-hand sibling node of an ONP-tree node contains a projection of a set difference between the data stored in the parent node of the ONP-tree node and the ONP-tree node.

4. The data management system of claim 1 wherein the meta data includes:
an indication of the number of dimensions of the multi-level/multi-dimensional data;
a list of names of the dimensions of the multi-level/multi-dimensional data; and
offsets to, and lengths of, each serialized and compressed ONP-tree node.

5. The data management system of claim 1 wherein the data management system control routines retrieve the particular projection of a multi-level, multi-dimension data set stored within the ONP tree data structure by
identifying one or more nodes of the ONP tree that contain the particular projection of the multi-level, multi-dimension data set,
extracting, deserializing and decompressing the one or more nodes to produce corresponding data containers, and
when two or more data containers are produced, merging the two or more data containers into a single data container containing the particular projection of the multi-level, multi-dimension data set.

6. A memory device comprising:
an ordered, nested, partition-tree ("ONP-tree") data structure that represents multi-level/multi-dimensional ("ML/MD") data, the ONP-tree data structure comprising:
meta-data; and
a serialized and compressed ONP tree;
wherein the serialized and compressed ONP tree comprises a number of serialized and compressed hash objects within the ONP-tree data structure,
in which the ONP-tree data structure is stored using a memory-mapped file facility that electronically stores data by a data management system implemented by a number of data-management-system control routines that are executed by a number of processors using memory-mapped files ("MMFs"),
in which the data-management-system control routines retrieve a particular projection of a multi-level, multi-dimension data set stored within the ONP-tree data structure that contains the ML/MD data;
in which each node of the ONP-tree data structure corresponds to a data container that stores a portion of the ML/MD data, and
in which each of the data containers corresponding to a direct ancestor node of a higher-level ONP node contains a projection of the data stored in the higher-level ONP-tree node.

7. The memory device of claim 6 further comprising a compressed hash object that stores highest-granularity and aggregated ML/MD data.

8. The memory device of claim 6 wherein the serialized and compressed ONP tree is compressed data corresponding to a serialized, sequentially-ordered set of compressed hash objects, each associated with an ONP-tree node name.

9. The memory device of claim 6
wherein the ONP-tree nodes comprise an acyclic tree in which each direct ancestor node of a higher-level ONP-tree node contains a projection of the data stored in the higher-level ONP-tree node; and
wherein each right-hand sibling node of an ONP-tree node contains a projection of a set difference between the data stored in the parent node of the ONP-tree node and the ONP-tree node.

10. The memory device of claim 6 stored as a memory-mapped file created and accessed through the memory-mapped file, data within the memory-mapped file automatically migrating from mass storage to memory and from memory to mass storage in order to provide rapid access to the data by the data management system.

11. The memory device of claim 6, in which the serialized and compressed ONP tree comprises a number of serialized and compressed hash objects within the ONP-tree data structure.

12. The memory device of claim 6 wherein the meta-data comprises:
an indication of the number of dimensions of the ML/MD data;

a list of names of the dimensions of the ML/MD data; and
offsets to, and lengths of, each serialized and compressed ONP-tree node.

13. The memory device of claim 12 wherein the meta-data further comprises:
a version number; and
an ONP-tree name.

14. The memory device of claim 6, further comprising a business-intelligence application stored therein, the business-intelligence application to, when executed by a processor:
provide an initial hash object that contains a full ML/MD dataset;
generate a list of hash objects containing the data for nodes below a root node of a partition tree used to generate an ordered, nested, partition-tree ("ONP-tree") data structure; and
generate a list of node names, each corresponding to a hash object in the list of hash objects.

15. The memory device of claim 14 wherein generating the list of hash objects and the list of node names further comprises:
recursively receiving, when no dimension has been pushed onto a stack, the initial hash object corresponding to a root node of the ONP-tree data structure and otherwise receiving a previously generated hash object corresponding to a non-root node of the ONP-tree data structure;
when no dimension has been pushed onto the stack, pushing a first dimension onto the stack, and otherwise pushing a new dimension onto a stack that succeeds, in a dimension order, a current top dimension on the stack;
adding a hash object corresponding to the received hash object to the list of hash objects;
adding a node name corresponding to the received hash object to the list of node names; and
iteratively generating hash objects and node names for the sibling ONP-tree nodes corresponding to the ONP-tree node represented by the received hash object, for the received hash object and for each iteratively-generated hash object generating hash objects and node names corresponding to the ancestor nodes of the received hash object and each iteratively-generated hash object.

16. The memory device of claim 14 wherein the business-intelligence application, when executed by the processor, further traverses the list of hash objects and the list of node names to generate the ONP-tree data structure.

17. The memory device of claim 16 wherein the business-intelligence application, when executed by the processor, further:
compresses each hash object in the list of hash objects to produce a compact set of serialized and compressed hash objects;
packages the compact set of serialized and compressed hash objects within the ONP-tree data structure; and
writes the ONP-tree data structure to a memory-mapped file.

18. The memory device of claim 17 wherein the business-intelligence application, when executed by the processor, further compresses the ONP-tree data structure before writing the ONP-tree data structure to the memory-mapped file.

19. A computer program product for efficient database management for multi-level/multi-dimensional (ML/MD) data, the computer program product comprising:
a computer readable storage medium comprising computer usable program code embodied therewith, the computer usable program code comprising:
computer usable program code to, when executed by a processor, generate a list of hash objects containing data for nodes below a root node of a partition tree used to generate an ordered, nested, partition-tree ("ONP-tree") data structure from an initial hash object corresponding to the root node that contains a full ML/MD dataset;
computer usable program code to, when executed by a processor, generate a list of node names, each corresponding to a hash object in the list of hash objects,
in which the computer usable program code to generating the list of hash objects and the list of node names comprises:
computer usable program code to, when executed by a processor, recursively receive, when no dimension has been pushed onto a stack, the initial hash object corresponding to a root node of the ONP-tree data structure and otherwise receive a previously generated hash object corresponding to a non-root node of the ONP-tree data structure;
computer usable program code to, when executed by a processor, when no dimension has been pushed onto the stack, push a first dimension onto the stack, and otherwise push a new dimension onto a stack that succeeds, in a dimension order, a current top dimension on the stack;
computer usable program code to, when executed by a processor, add a hash object corresponding to the received hash object to the list of hash objects;
computer usable program code to, when executed by a processor, add a node name corresponding to the received hash object to the list of node names; and
computer usable program code to, when executed by a processor, iteratively generate hash objects and node names for the sibling ONP-tree nodes corresponding to the ONP-tree node represented by the received hash object, for the received hash object and for each iteratively-generated hash object generate hash objects and node names corresponding to the ancestor nodes of the received hash object and each iteratively-generated hash object.

20. The computer program product of claim 19, wherein the ONP-tree data structure comprises:
meta-data; and
a serialized and compressed ONP tree, the serialized and compressed ONP tree comprising a number of serialized and compressed hash objects within the ONP-tree data structure.

* * * * *